(12) United States Patent
Mantripragada et al.

(10) Patent No.: US 8,730,946 B2
(45) Date of Patent: May 20, 2014

(54) SYSTEM AND METHOD TO PRECISELY LEARN AND ABSTRACT THE POSITIVE FLOW BEHAVIOR OF A UNIFIED COMMUNICATION (UC) APPLICATION AND ENDPOINTS

(75) Inventors: Srinivas Mantripragada, Cupertino, CA (US); Amitava Mukherjee, San Ramon, CA (US)

(73) Assignee: Redshift Internetworking, Inc., Milpitas, CA (US)

( * ) Notice: Subject to any disclaimer, the term of this patent is extended or adjusted under 35 U.S.C. 154(b) by 1189 days.

(21) Appl. No.: 12/254,735

(22) Filed: Oct. 20, 2008

(65) Prior Publication Data

US 2009/0103524 A1   Apr. 23, 2009

Related U.S. Application Data

(60) Provisional application No. 60/981,004, filed on Oct. 18, 2007.

(51) Int. Cl.
*H04L 12/66* (2006.01)
*G06F 15/16* (2006.01)

(52) U.S. Cl.
USPC ............................ 370/352; 709/203; 709/206

(58) Field of Classification Search
USPC .................................... 726/22; 709/206–209
See application file for complete search history.

(56) References Cited

U.S. PATENT DOCUMENTS

| | | |
|---|---|---|
| 2002/0196782 A1 | 12/2002 | Furukawa et al. |
| 2003/0002676 A1 | 1/2003 | Stachura et al. |
| 2003/0128717 A1 | 7/2003 | Johnson et al. |
| 2004/0049701 A1 | 3/2004 | Le Pennec et al. |
| 2004/0148252 A1 | 7/2004 | Fleishman |
| 2004/0185931 A1 | 9/2004 | Lowell et al. |
| 2005/0005150 A1 | 1/2005 | Ballard |

(Continued)

OTHER PUBLICATIONS

US2008/071388 Redshift Internetworking, Inc.—PCT Search Report and Written Opinion, U.S. Appl. No. 12/181,135, Oct. 22, 2008.

(Continued)

*Primary Examiner* — Brandon Renner
(74) *Attorney, Agent, or Firm* — Orrick, Herrington & Sutcliffe LLP

(57) ABSTRACT

A system and method to precisely learn and enforce security rules for Unified Communication (UC) applications and endpoints is disclosed. According to one embodiment, a behavioral learning system learns and abstracts positive flow behaviors of UC applications and endpoints. The properties of previously received messages from the endpoints and learned behaviors of the plurality of endpoints are stored in a database. A message from a endpoint is received by a message scanner and correlated with the AOR records in the database. The message is classified into one of a whitelist, a blacklist, and a graylist based on the results of analysis by the analysis engine. The whitelist contains the AOR records that are legitimate, the blacklist contains the AOR records that are a potential attack, and the graylist contains the AOR records that belong to neither the whitelist nor the blacklist. Based on the analysis and inspection of the message in light of the learned behaviors, a decision is made to allow, deny, quarantine or redirect the message.

18 Claims, 8 Drawing Sheets

(56) References Cited

U.S. PATENT DOCUMENTS

| | | | |
|---|---|---|---|
| 2005/0210272 A1* | 9/2005 | Fotta | 713/188 |
| 2005/0262208 A1* | 11/2005 | Haviv et al. | 709/206 |
| 2005/0288961 A1* | 12/2005 | Tabrizi | 705/1 |
| 2006/0168033 A1* | 7/2006 | Cai et al. | 709/206 |
| 2006/0182029 A1 | 8/2006 | Kealy et al. | |
| 2006/0288420 A1 | 12/2006 | Mantripragada et al. | |
| 2007/0083929 A1* | 4/2007 | Sprosts et al. | 726/22 |
| 2007/0110053 A1 | 5/2007 | Soni et al. | |
| 2007/0124389 A1* | 5/2007 | Cai et al. | 709/206 |
| 2008/0201411 A1* | 8/2008 | Paritosh | 709/203 |

OTHER PUBLICATIONS

R. Dantu, and P. Kolan, "Detecting Spam in VoIP Networks," in Proc. of the Steps to Reducing Unwanted Traffic on the Internet Workshop, pp. 31-37, Cambridge MA, Jul. 2005.

U.S. Appl. No. 12/181,135 System and Method for Unified Communications Threat Management (UCTM) for Converged Voice, Video and Multi-Media Over IP Flows.

U.S. Appl. No. 12/254,735 "System and Method to Precisely Learn and Abstract the Positive Flow Behavior of a Unified Communication (UC) Application and Endpoints".

* cited by examiner

SYSTEM AND METHOD TO PRECISELY LEARN AND ABSTRACT THE POSITIVE FLOW BEHAVIOR OF A UNIFIED COMMUNICATION (UC) APPLICATION AND ENDPOINTS

The present application claims the benefit of and priority to U.S. Provisional Patent Application No. 60/981,004 filed on Oct. 18, 2007, entitled "A Method And System To Precisely Learn And Abstract The Positive Flow Behavior Of An Unified Communication (UC) Application And Endpoints." U.S. Provisional Patent Applications 60/981,004 is hereby incorporated by reference.

FIELD

The field of the invention relates generally to communication over Internet Protocol (IP). In particular, the present method and system is directed to learning and abstracting positive flow behaviors of Unified Communication (UC) applications and endpoints in a network.

BACKGROUND

The emergence of Voice-over-IP (VoIP) and Unified Communications (UC) technology has caused a fundamental shift in the telecommunications industry. Due to numerous benefits of VoIP/UC systems ranging from low cost, manageability, pervasiveness of IP communication networks and easy integration with other IP-based software-enabled services, traditional Private Branch eXchange (PBX)/UC systems are increasingly replaced with their IP counterparts. The growing popularity of VoIP/UC networks is largely influenced by two benefits: cost savings achieved by migration from Public Switched Telephone Network (PSTN) to VoIP networks and the flexibility of adding new services and applications to the standard telephony platform. The underlying common IP-based communication platform enables richer application and services than were otherwise possible. The migration from PSTN to VoIP fundamentally has changed the communications landscape and the way various end-nodes of a network communicate with one another or with applications.

However, massive deployment of VoIP/UC faces challenges that need to be effectively addressed to gain widespread adoption. VoIP/UC solution providers need to provide high quality, reliability and security standards that traditional PSTNs offer. Developing a robust architecture that adheres to these constraints is a challenging task.

A number of recent studies showed that nearly half of VoIP/UC service providers planning to deploy VoIP/UC networks affirm that current networks and applications are inherently insecure. The security issue is a major concern for VoIP/UC service providers because security vulnerabilities are not yet well understood, and preventive measures for security have not yet been fully adopted.

VoIP/UC security is vastly different from conventional data security due to the real-time nature of VoIP/UC communications. Real-time characteristics include: zero down time, near close to 100% Quality-of-Service (QoS), reliability, low latency overheads and security. VoIP/UC solutions need to comply with the complex VoIP/UC network standards involving a myriad of protocols, applications and devices while maintaining the dependency with existing PSTN systems. A VoIP/UC network is a converged network of PSTN and IP-telephony, thus it is subject to security threats that potentially emanate from either one of the two networks. Due to the number of potential threat vectors arising from the convergence of PSTN and IP-telephony networks, the underlying security protection measures based on either one of the network architectures are not well suited to counterattack most of them. In addition, VoIP/UC networks require close-to-perfect reliability because of the real-time requirement for voice communication. For data-only communication, a typical response to a security attack involves a human intervention, which incurs significant time delays to reduce the scope of the threat and provides appropriate mitigation solutions. Unlike data-only communication, human interventions are inadequate for VoIP/UC communications, which require a real-time response to security threats.

VoIP/UC communication is highly sensitive to QoS parameters. A VoIP/UC security solution causing a noticeable loss in voice quality is unacceptable. Any interruption in the flow of packets, reassembly or jitter impacts the quality of voice conversation. For data communication, the lost data is retransmitted causing additional delay. While this may be acceptable for simple data communication, retransmission in the VoIP/UC realm implies that the caller has to repeat the lost voice message or reinvoke the UC service, which makes any solution that introduces time delay by retransmission an unacceptable solution.

Latency is another factor to consider when deploying VoIP/UC solutions. Modern data security solutions employ encryption and/or deep-packet inspection methods to improve security. Both of these methods introduce additional time delays and jitters to VoIP/UC packet streams, thus impacting the overall QoS of voice steams.

VoIP/UC networks interacting with and depending on existing PSTN networks pose a new set of challenges such as attack entry vectors and application threats. With a myriad of deployment solutions and architectures spanning the VoIP and traditional PSTN networks, the complexity of threat detection and mitigation grows exponentially.

The emergence of Voice-over-IP (VoIP), Unified Communications (UC) and Communications Enabled Business Process (CEBP) solutions has changed the way that enterprises communicate with each other. The convergence of voice and data into a single IP network creates a cost-effective transport mechanism that enables a new set of services. Voice, which was previously confined to a separate legacy network (e.g., PSTN), became ubiquitous and plays an integral role in communication among and bridging disparate entities. These entities include multiple users and user groups both inside and outside the enterprise, as well as advanced applications that enable communication with other entities anywhere, anytime with any device. The converged VoIP, UC and CEBP solutions need to comply with a myriad of protocols, applications and devices including the ones on legacy voice networks. These compliance requirements expose the convergent solutions to threat vectors that emanate from multiple entry points and pose formidable challenges with security and reliability.

SUMMARY

A system and method to precisely learn and enforce security rules for Unified Communication (UC) applications and endpoints is disclosed. According to one embodiment, a behavioral learning system learns and abstracts positive flow behaviors of UC applications and endpoints. The properties of previously received messages from the endpoints and learned behaviors of the plurality of endpoints are stored in a database. A message from an endpoint is received by a message scanner and correlated with the AOR records in the database. The message is classified into one of a whitelist, a blacklist, and a graylist based on the results of analysis by the analysis engine. The whitelist contains the AOR records that are legitimate, the blacklist contains the AOR records that are a potential attack, and the graylist contains the AOR records that belong to neither the whitelist nor the blacklist. Based on the analysis and inspection of the message in light of the learned behaviors, a decision is made to allow, deny, quarantine or redirect the message.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

Figure 1:
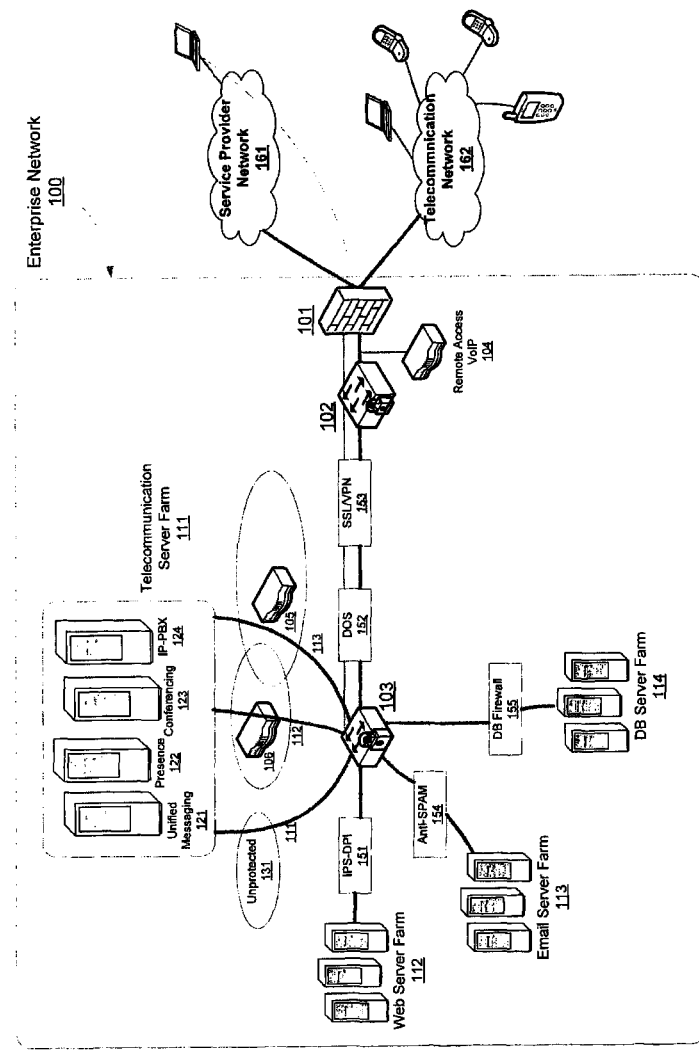
FIG. 1 illustrates an exemplary enterprise network including various server farms, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method to precisely learn and enforce security rules for Unified Communication (UC) applications and endpoints is disclosed. According to one embodiment, a behavioral learning system learns and abstracts positive flow behaviors of UC applications and endpoints. The properties of previously received messages from the endpoints and learned behaviors of the plurality of endpoints are stored in a database. A message from a endpoint is received by a message scanner and correlated with the AOR records in the database. The message is classified into one of a whitelist, a blacklist, and a graylist based on the results of analysis by the analysis engine. The whitelist contains the AOR records that are legitimate, the blacklist contains the AOR records that are a potential attack, and the graylist contains the AOR records that belong to neither the whitelist nor the blacklist. Based on the analysis and inspection of the message in light of the learned behaviors, a decision is made to allow, deny, quarantine or redirect the message.

Each of the features and teachings disclosed herein can be utilized separately or in conjunction with other features and teachings to provide a system and method and system to precisely learn and enforce positive security model for unified communication applications and endpoints. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates an exemplary enterprise network including various server farms such as telecommunication server farm 111, Web server farm 112, email server farm 113 and database server farm 114, according to one embodiment. Telecommunication server farm 111 includes unified messaging (UM) server 121, presence server 122, conferencing server 123 and IP-PBX server 124. UCTM system 105 is placed in front of telecommunication server farm 111 and acts as a proxy-gateway solution inspecting both inbound and outbound traffic. UCTM system 105 applies different security policies to an application running at a server farm in addition to binding the application to an user or a group of users. This allows for applying different security policies at various endpoints depending on the trust level of the entry user group. For example, user groups whose identity are known a priori such as a mobile office employee or OEM partner connecting through Skype or SSL-VPN access may benefit from services providing flexible security policies.

Communication flows arrive at the forefront of enterprise network 100 from various external networks including service provider network 161 and telecommunication network 162. Such communication flows may arrive at firewall 101 from network devices or nodes having intention for security attack. Some types of security attacks are blocked or filtered by a series of enterprise routers 102, 103, Denial of Service (DOS) protection 152 or Secure Sockets Layer protection 153.

A typical UC service such as a Web conferencing session hosted by conferencing server 123 requires a valid registration, and communication flows potentially spanning multiple server farms. In particular, communication flows to telecommunication servers are subject to various levels of protection; communication flows 111 indicate unprotected communication flows. Communication flows 113 are protected by UCTM system 105 whereas communication flows 112 are protected by other vendors 106 for existing applications/servers, typically dedicated to a single application/server.

Figure 2:
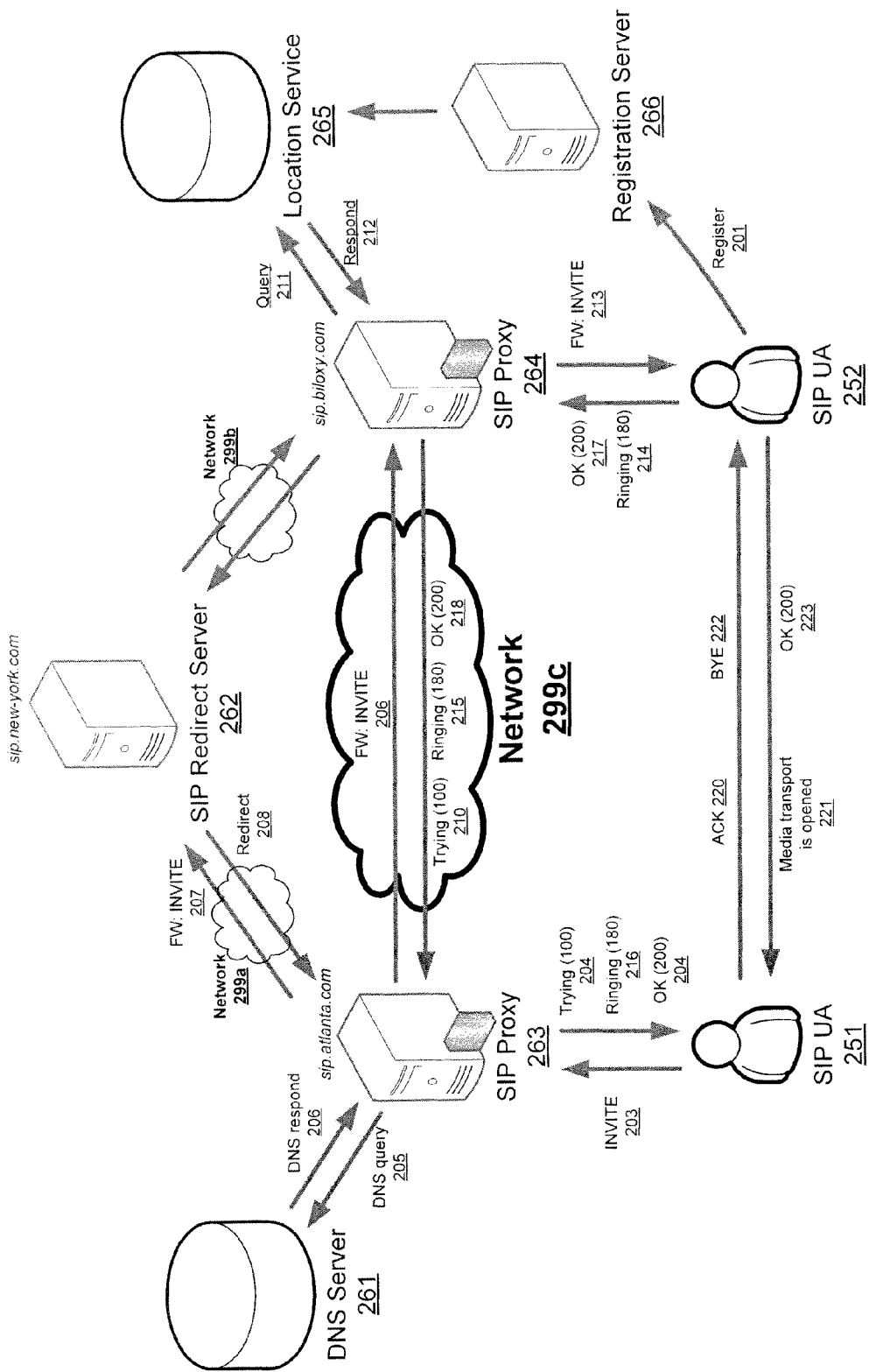
FIG. 2 illustrates an exemplary Session Initiation Protocol (SIP) flow involving a SIP call, according to one embodiment.

FIG. 2 illustrates an exemplary Session Initiation Protocol (SIP) flow involving a SIP call, according to one embodiment. User Agent (UA) 251 (sip:alice@atlanta.com) calls another UA 252 (sip:bob@biloxy.com). The SIP call starts with an invite message 203 from UA 251 to UA 252. SIP proxy server 263 (sip.atlanta.com) queries DNS server 261 to resolve UA 252's domain (biloxy.com) via 205 and 206 and requests SIP redirect server 262 to redirect UA 251's call request when UA 252 is outside the range of the SIP proxy server 263. After UA 251's call request arrives (sip.biloxy.com) either via SIP proxy server 263 or SIP redirect server 262 over network 299, SIP proxy server 264 queries location service 265 to resolve UA 252's internal address. UA 252's phone rings and, when followed by an affirmative response by UA 252, the media connection flow is directly established between UA 251 and 252.

UA's devices (phones, PDAs, etc.) are registered with a registration server prior to using SIP calls. For example, UA 252's phone number is registered with registration server 266 and its registration information is stored in location service 265. When an incoming call arrives, SIP proxy server 264 queries location service 265 to identify UA 252's phone number where the incoming call is redirected to.

Unified Communication threat management (UCTM) is a highly specialized solution designed for providing complete protection, visibility and control for voice-, video-, and multimedia-over-IP traffic. According to one embodiment, UCTM system 105 performs a blended approach to security combining stateful inspection, protocol anomaly detection and intrusion prevention with application-aware techniques such as Voice Denial-Of-Service (VDOS) protection, voice SPAM prevention and threat protection and policy enforcement for UC and CEBP applications. In addition, UCTM system 105 meets real-time traffic needs of the UC services. As a result, UCTM system 105 combines security services for data and voice to provide not only comprehensive protection against a plethora of voice, video and multimedia IP threats but also complete control and visibility of real-time traffic.

According to one embodiment, UCTM system 105 satisfies five categories or criteria to effectively address VoIP/UC security and deployment challenges.

Category I (real-time requirements) requires high reliability. For example, 99.999% uptime having less than 5 minutes of downtime per year needs to be guaranteed. In addition, real-time requirements also include low latency for media and signaling and stringent Quality-of-Service (QoS) jitter having less than 100 microseconds for media and 2 milliseconds for signaling.

Category II (security requirements) requires low tolerance to false-positives and false-negatives. Under this category, call re-attempts are not acceptable. UCTM system 105 employs encrypted traffic (e.g., SIP/TLS, SRTP).

Category III (technology requirements) requires capabilities for deep packet inspection from Layer 3 to Layer 7 VoIP and UC traffic. UCTM system 105 employs a heterogeneous architecture having both pro-active and reactive solution elements. It also maintains multiple levels of call state with adaptive behavioral learning of both UC applications and VoIP endpoints. It further provides advanced correlation of protocol state with security events across the different layers and security modules. Category III requirements comprehensively address VoIP, UC and CEBP application security threats such as SIP/SCCP/H.323 protocol anomaly detection, Intrusion Prevention System (IPS), voice DOS and SPAM over Internet Telephony (SPIT) prevention, eavesdropping, toll fraud, number harvesting, Man-in-the-middle (MITM) attacks as well as UC-aware policy and incident management system.

Category IV (enterprise focus) requires deeper interoperability with disparate systems. Complex services spanning multiple protocols are employed. UCTM system 105 employs zero-touch deployment requirement under this category.

Category V (UC and CEBP communications focus) requires tight integration with IP-PBX and other communication infrastructure elements for the ease of deployment and manageability. Third party vendor solutions providing UC and SOA services (e.g., Microsoft, SAP, BEA, IBM) are easily integrated. Under Category V, all VoIP and UC traffic are visible, and controls of all UC services, applications and assets are provided.

Intrusion Detection System (IDS) and Intrusion Prevention System (IPS) vendors are strong in enterprise focus (Category IV) but are not well suited to meet real-time requirements (Category I). They have a high degree of false-positives (Category II) and lack technological elements (e.g., advanced call state correlation) required to address complex blended threats that may span multiple VoIP/UC protocols (Category III). Conventional data security solutions also lack UC and CEBP communication focus (Category V).

UTM vendors provide solutions that are very similar to that of IDS/IPS vendors but lack best-of-breed solution and technological elements. They provide solutions that are better suited for price sensitive small and medium businesses (SMB) at a significantly lower price. UTM devices are mired in performance related issues and do not provide solutions under Categories II, III and V.

Session Border Controller (SBC) vendors provide security solutions that are very strong in Category I (real-time) and adequate for carrier and edge (or border) protection deployments. They are, however, not enterprise-focused, therefore lack the necessary technological and solution elements required for providing adequate UC and CEBP application security (Categories III, IV and V).

Existing IP-PBX players are primarily focused on providing end-user voice solutions and equipment. Their solutions are strong in real-time (Category I), enterprise (Category IV) and UC focus (Category V) but are not focused on providing security solutions (Category II and III).

Conventional security solutions such as IDS/IPS appliances, network firewalls, UTM and/or SBC vendors are not well suited for addressing the complex VoIP and UC security requirements and deployment challenges.

Figure 3:
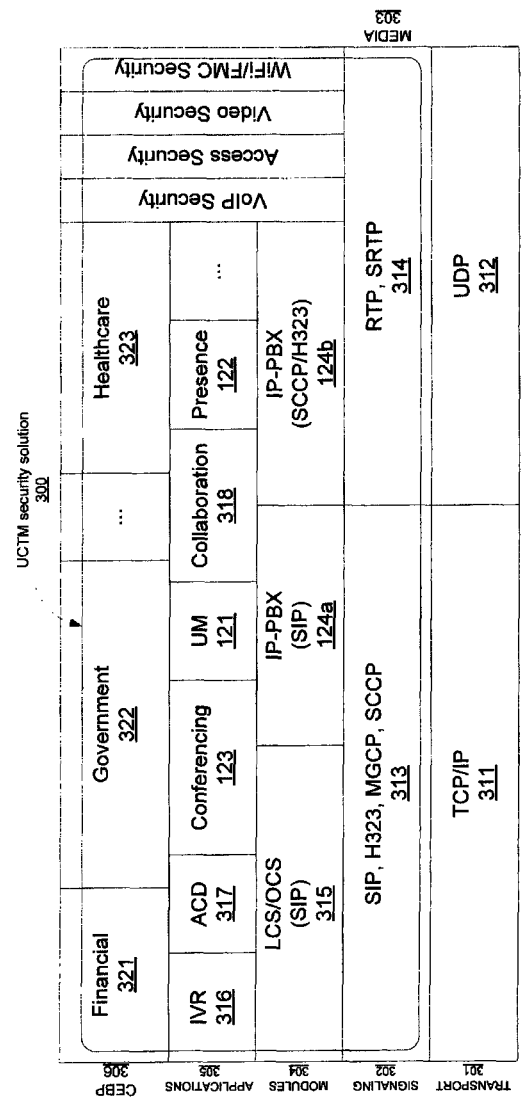
FIG. 3 illustrates an exemplary UCTM security solution that correlates protocol, endpoint and application transaction states across signaling, media, modules, applications and Communications Enabled Business Process (CEBP), according to one embodiment.

FIG. 3 illustrates an exemplary UCTM security solution that correlates protocol, endpoint and application transaction states across signaling, media, modules, applications and CEBP, according to one embodiment. Signaling layer 302 includes VoIP protocols 313 such as SIP, H.323, Media Gateway Control Protocol (MGCP) and Skinny Call Control Protocol (SCCP) as well as media protocols 303 such as Real-time Transport Protocol (RTP) and Secure RTP (SRTP) protocols 314. Modules 304 include communications servers 315 such as Office Communications Server (OCS), Live Communications Server (LCS) and IP-PBX servers 124. Exemplary UCTM applications 305 include Interactive Voice Response (IVR) 316, Automated Call Distribution (ACD), conferencing (Web or voice) 123, Unified Messaging (UM) 121, collaboration 318 and presence applications 122. CEBP applications 306 are tailored for unique business processes such as financial 321, government 322 and healthcare applications 323. Current solutions are limited to individual silos but UCTM security solution provides a unified solution across signaling, media, modules, applications and CEBP layers. For example, a communication signal without deep packet inspection and stateful analysis results in an attack that is not correctly identified or detected.

Several thousand threats for VoIP have been compiled from various sources, such as VOIPSA group, CERT, BugTraq and other vulnerability postings from several vendors. VoIP deployment is hampered by a variety of threats at different entry points and attack vectors that exploit weaknesses. Such weaknesses exist in network layer, underlying OS, network protocol, application layer and/or device configuration.

Figure 4:
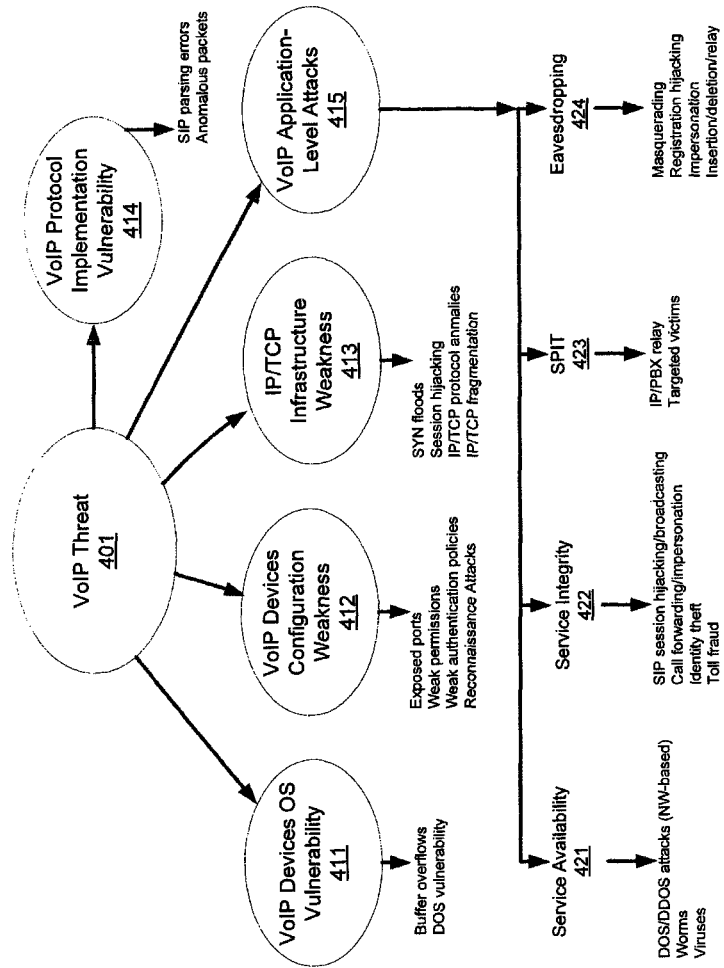
FIG. 4 illustrates exemplary VoIP threats categorized by common attack types with similar entry methods and common vulnerability exploitation, according to one embodiment.

FIG. 4 illustrates exemplary VoIP threats 401 categorized by common attack types with similar entry methods and common vulnerability exploitation, according to one embodiment. Categorizing VoIP threats helps better understand various VoIP threat vectors such that a common effective security solution for each category is formulated.

VoIP device OS vulnerability 411 includes VoIP threats from VoIP devices such as IP phones, call managers, gateways, registration and other proxy servers run an operating system (OS). Compromise of the underlying OS leads to an integrity compromise of the VoIP device running the OS. Most of the VoIP devices run on traditional operating systems (e.g., Windows, Linux, RTOS) that are vulnerable with numerous exploits that are publicly available. For example, buffer overflow against a device OS is a well-known attack exploiting VoIP Device OS vulnerability. Denial-of-Service (DoS) triggered by fragmented UDP packets is another example under this category.

VoIP device configuration weakness treats 412 refer to the threats penetrating through VoIP infrastructures due to weaknesses in configurations such as open TCP/UDP ports, open file shares with global read/write permissions or temporary folders with weak permissions, etc. As a result, the services running on the VoIP device become vulnerable to a wide variety of attacks resulting in either a loss of service or a compromise of the VoIP device. For example, a known SIP-based phone telnet service allows the telnet service to be exploited by an attacker due to weak password permissions set on the VoIP device. In addition, Simple Network Management Protocol (SNMP) services offered by the VoIP device are vulnerable to reconnaissance attacks, and valuable information is gathered from an IP phone by using SNMP queries with the "public" community name.

IP/TCP infrastructure weakness threats 413 rely on transport protocols such as TCP/IP 311 or UDP 312. The availability of a VoIP/UC service depends on the availability of the underlying IP/TCP infrastructure. VoIP protocols rely on TCP and UDP as transport mediums and hence are also vulnerable to attacks that TCP and UDP are generally exposed to such as DOS/DDOS, session hijacking, protocol anomalies, etc. and cause an undesirable behavior on the VoIP services.

VoIP protocols implementation vulnerability threats 414 rely on the VoIP protocols such as SIP, H.323 that are relatively new standards. Both the protocol specifications and the subsequent implementations need to mature to reduce the overall threat exposure. Examples include parsing errors, NULL packets, anomalous packets, RFC violations etc. Several vulnerabilities are discovered in vendor implementations of VoIP products that use H.323 and SIP.

According to one embodiment, VoIP application-level threats 415 are grouped into the following four categories based on various entries and injection mechanisms: service availability attacks 421, service integrity attacks 422, SPAM over Internet Telephony (SPIT) 423 and eavesdropping attacks 424.

Service availability attacks 421 are focused on disrupting the availability of VoIP services. The unavailability of a critical service has a direct customer impact, lost revenues, unplanned downtimes and maintenance costs. Such examples include VDOS attacks, remote code injection and viruses or worm-based threats. The affected clients are end-user VoIP applications, phones, soft-clients, call managers, registration servers, etc. Due to the real-time nature of VoIP applications, any disruption in service causes tremendous business impact including financial loss and loss of productivity.

Service integrity attacks 422 are focused on compromising the integrity of VoIP services. These attacks are very targeted and usually difficult to detect. These attacks ruin the reputation and brand name of the service provider, and result in leakage of sensitive information by phishing attacks. Some examples of service integrity attacks include collaboration session hijacking, redirecting existing media conversations to an attacker's machine, classic man-in-the-middle (MITM) attack, broadcast hijacking, identity theft, conversation alteration, impersonation and toll fraud.

SPIT attacks 423 impose potential threats like its email counterpart. With increasing deployment of IP solutions, SPIT is expected to be an attractive choice for spammers due to its low cost and pervasiveness of the Internet. Conventional SPAM methods adopted by telemarketers require a human presence manually dialing the phone numbers and making the voice connections. This attack pattern is drastically changed with IP networks, as even a simple computer script can flood vulnerable corporate phone systems with SPAMs.

Eavesdropping attacks 424 allow attackers to obtain sensitive business or personal information otherwise deemed confidential. The eavesdropping mechanism exploits intercepting and reading of messages and conversations by an unintended party. Once the information is collected and translated, various Man-in-the-Middle (MITM) attacks can be launched (e.g., reading, inserting, modifying the intercepted messages). Some examples include masquerading, registration hijacking, impersonation and replay attacks.

The last decade has seen a rise in several best-of-breed point security products to overcome the challenges presented by ever changing threats including network firewalls, SSL VPN appliances, DOS protection, anti-virus, IDS/IPS, anti-SPAM and content filtering solutions. All of these point products provide best-of-breed protection for the threats that they are well adept with. However, these products typically work in isolation in the network with limited end-to-end system visibility and control. Oftentimes, the Layer 3-7 networking stack functions are executed multiple times without good inter-communication between them. In addition, each product provides its own management console presenting unique challenges for effective end-to-end network configuration with correct policies.

Deployment and management of these point products became a big challenge for enterprise networks. This leads to the rise of Unified Threat Management (UTM) solutions that provide several of the above features in a single box. In general, deploying a single multi-function device reduces costs and overall management. Each of the security functions works in loosely coupled form but the common UTM framework provides a central management console of managing and configuring the product. There are widely perceived deployment challenges faced by current UTM solutions: performance bottlenecks, scalability, not best-of-breed solutions, architectural limitations and reliability. Current UTM solutions are also very much limited to enterprise data networks.

Voice/video, multimedia and other Unified Communications (UC) pose a different set of challenges. Real-time communication mandates high reliability and requires near perfect latency, low jitter with near-zero false-positives and negatives. The real-time requirements present challenges for conventional enterprise-focused UTM solutions that are deployed in data-centric networks.

Figure 5:
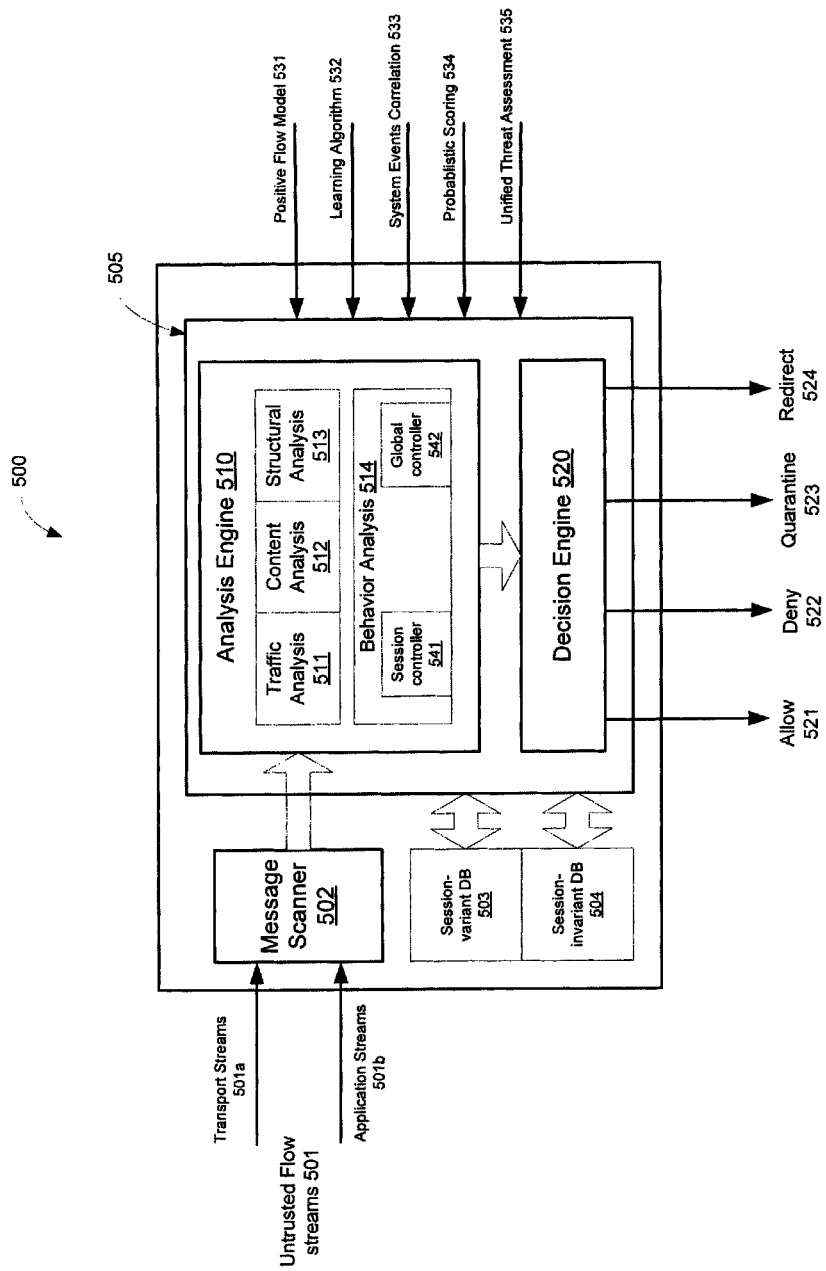
FIG. 5 illustrates an exemplary logical flow for analysis and inspection of untrusted flow streams using a behavioral learning engine, according to one embodiment.

FIG. 5 illustrates a block diagram of an exemplary behavioral learning system, according to one embodiment. Behavioral learning system 500 contains four analysis modules: traffic analysis module 511, content analysis module 512, structural analysis module 513, and behavioral analysis module 514. Behavioral learning system 500 inspects untrusted flow streams 501 including transport streams 501a and application streams 501b using a combination of the following inspection methods.

Positive flow model inspection 531 determines whether an incoming untrusted flow stream 501 corresponds to a positive flow model. Positive flow models of various applications on which behavioral learning system 500 operates define legitimate flow streams to distinguish them from potential attacks or bad behaviors. Behavioral learning system 500 records positive attributes of incoming flow streams 501 along with the corresponding application responses. Positive attributes include both session-variant and session-invariant properties of incoming flow streams 501 such as session keys, source IP, destination IP, header name and types, parameter name and types, call duration, and routing information. The collection of positive attributes constitutes active fingerprints that uniquely identify and ensure legitimacy of connectivity transactions between endpoints (e.g., caller/callee) and application servers (e.g., VoIP application server).

Learning algorithm inspection 532 captures the behavior of endpoints and applications. The learned behaviors of registered endpoints and applications are used to efficiently identify positive attributes of flow streams.

System events correlation inspection 533 correlates system events that are exchanged among analysis modules 511-514 and inspection engines 531-535. Analysis modules 511-514 examine transport and incoming flow streams 501 in parallel. In one embodiment, a single communication stream is examined by multiple analysis modules and inspection engines in the analysis phase for its legitimacy (e.g., VDOS/VDDOS, rate, IPS, SPIT, protocol anomaly). According to one embodiment, each analysis module 511-514 or inspection engine 531-535 communicates its results in the form of system events to decision engine 520. Examples of system events are notifications of normal events or invalid requests due to bad inputs, detection of source IP in the blacklist, and detection of request rates exceeding thresholds. Various system events are gathered, correlated, and matched with any previously learned state by decision engine 520 to conclusively identify the presence of a bad behavior or an attack.

Probabilistic scoring inspection 534 provides advanced scoring mechanisms using multivariate probability metrics. The scores are used to classify and update the status of flow streams. Unified threat assessment inspection 535 correlates the various meta information passed from analysis modules 511-514 to detect malicious activity with high fidelity.

Behavioral learning system 500 inspects untrusted flow streams 501 at a transport layer (e.g., TCP, UDP) and an application layer (e.g., SIP, RTP, Session Description Protocol (SDP), XML). Once the protocol specific properties are abstracted out, the received flow streams are analyzed and inspected in a protocol agnostic form. Based on the results of analysis by analysis and inspection engines 505, decision engine 520 determines an appropriate action 521-524.

According to one embodiment, structural analysis module 513 breaks flow streams 501 into individual structural (or lexical) tokens and stores them in a pair format. For example, [<content-type>;<application/sdp>] constitutes a unique pair in a [<name>;<value>] format for a specific connection flow type. Structural tokens for each flow generated by structural analysis module 513 by extracting structural elements from both request and response flow streams make entries in an address-of-record (AOR) table. Each AOR record is validated against various validation specifications that behavioral learning system 500 enforces. The AOR table and the validation specifications might be stored in a session-variant or session-invariant database 503 or 504, or each analysis module 511-514 may have a storage space for storing frequently referenced AOR records or validation specifications.

In one embodiment, user-provided access control lists (ACLs) are used for validation by an inspection engine 531-535. For example, user SIP inputs may not exceed 126 characters in length or violate Unicode restrictions for certain SIP inputs. In another embodiment, factory-installed recommendations are used for validation. For example, incoming SIP requests are blocked if they contain a malicious JavaScript code or an SQL command, or if the number of errors generated by an application exceeds a threshold. In yet another embodiment, learned behaviors by behavioral learning system 500 such as matching user and endpoint, or flow- and/or application-generated responses are used for validation.

Content analysis module 512 ensures the integrity of media (or RTP) streams that ride on top of UDP. Attacks against RTP are applicable to virtually any VoIP or SIP environment. Manin-the-Middle (MITM) attacks have a stateless nature due to the UDP protocol. The ranges of these attacks vary from mixing and recording to inserting new audio into an active conversation. Content analysis module 512 updates AOR table entries with media state variables in a session comprising one or more message packets to ensure that they are not tampered while the session is active.

According to one embodiment, media state variables are classified into two groups: session state variables and global variables. Session state variables include but are not limited to RTP protocol header sequence number (16 bits), RTP protocol header timestamp (32 bits), RTP protocol header synchronization source identification (32 bits), UDP protocol header source port, UDP protocol header destination port, IP protocol header source IP address, IP protocol header identification, and Ethernet protocol MAC address. Global variables include but are not limited to version (2 bits), padding (1 bit), extension (1 bit), CSRC (Contributing Source) count (4 bits), marker (1 bit), and payload (7 bits). Media streams that are not compliant with existing session flows (e.g., out-of-order sequence number packets, modified UDP protocol header destination port) are rejected by content analysis module 512.

Traffic analysis module 511 inspects both request and response packets to and from an application server. The response results are matched with the prior inserted request AOR records to ensure that the request and response transactions are carried out in a high integrity order. Each AOR record stores both request and response elements. All response codes including an error response code are stored in the AOR table such that future attacks containing an error response code found in its AOR record are thwarted before reaching an application server.

Traffic analysis is especially useful for preventing fuzzing style or war-dialing style attacks. Fuzzing style attacks include random and often malformed request flows with an attempt to exploit any vulnerability in an application. Fuzzing style attacks eventually crash the system causing denial-of-service and loss of business revenue. Examples of fuzzing attacks are messages with garbled non-RFC compliant characters and messages containing JavaScript, a malicious code or exceedingly long strings to generate buffer overflows in a poorly written application. War-dialing attacks involve a phenomenon where multiple destination endpoints are dialed simultaneously. War-dialing attacks are often initiated from a single origination source using advance scripting and traffic generation tools, resulting in a denial-of-service on the endpoints. Traffic analysis module 511 detects anomalic events, for example, by detecting a sudden upsurge in error response codes, and communicates to decision engine 520 for further processing. According to one embodiment, traffic analysis module 511 is also capable of learning legitimate network activities (e.g., valid URLs, IPs, phone extensions). Traffic analysis module 511 emits an anomalic event to decision engine 520 if any aberration to the learned activity is detected.

According to one embodiment, behavior analysis module 514 includes session controller 541 and global controller 542. Session controller 541 is responsible for maintaining, updating, purging, and retrieving session AOR records to ensure that the memory and performance characteristics are observed. Session controller 541 is also responsible for blocking replay, hijacking, manipulation, and tampering or poisoning of a session such that the AOR session tables created by structural analysis module 513 are preserved in pristine order.

Global controller 542 is responsible for tracking all global (or system) activities of flow streams such as the number of active users and peak users, the average and peak latency, the number of live applications, the call frequency, and the average and peak call duration. Global controller 542 stores all non-session (or session-invariant) variables of a session. The combination of session-variant and session-invariant information presents a unique active fingerprint of the session.

Session-invariant information does not change between different messages or sessions for a particular user. The stored session-invariant information is keyed off of the user's AOR records. Examples of session-invariant information includes:
1) User Agent
2) Source IP
3) Source port
4) Contact URL
5) User name
6) Realm
7) Max Forwards User agent that is a logical entity at endpoints capable of initiating and answering calls is constant for an AOR contact pair. Source IP and source port are constant for a session. Clients have to re-register when their IP changes. Contact URL records a set of URLs based on the active registration of a user. Max forwards is constant for a particular request uniform resource indicator (URI).

Session-variant information is kept alive as long as a session is active. The session could be any of the above-mentioned types. Following are the information that remains constant for the duration of a session.
1) Contact
2) Via
3) Call-ID
4) Received sequence number (increasing)
5) Send sequence number (increasing)
6) From URL
7) To URL
8) From tag
9) To tag
10) RTP IP and port (for a media session)

Some of these session-variant information may be updated based on information in other session messages.

An active fingerprint contains a set of entities from the session-invariant database and the matching set of entities from the session-variant database. Session controller 541 uses the stored active fingerprints to inspect future incoming requests. For example, if the fingerprint of the last request within the same session does not match with that of a new request, the new request is invalidated.

According to one embodiment, the following heuristic inspections are performed by behavior analysis module 514. The "from" header is inspected to identify the sender of a message and create an AOR record. The "date" and "time" headers are used to validate the duration of a message packet or the time lapse between message packets. The duration data may be used as a user-controlled option. The "call-ID" header is recorded to uniquely identify a single call transaction sequence between endpoints. The "contact" header is used to tie an AOR record to a particular device instance that involves the participating endpoints in a transaction. The "CSeq" header is used to track the sequence number of a SIP transaction. Sometimes, multiple requests may be generated using the same CSeq header for an entire dialog. Additional checks may be performed to prevent false-positives. The "to" header is used to designate the original URI that a caller intended to reach. Additional checks may be performed if re-targeting occurs at some point in the network that changes the "to" header.

Utilizing the above-described inspection methods, various types of SPIT attacks can be detected, and appropriate actions (e.g., 521-524) taken against the attacks. For example, if a request is replayed within a time/date interval, session controller 541 recognizes that the request is invalid because of call-ID duplication. If a request is replayed after the time/date interval, session controller 541 recognizes that the request is invalid because the date is stale. The contact header field contains a URI that is unique for each endpoint. The URI of the origination source is recorded during the initial signaling setup before the call request is initiated. If an attacker intercepts a legitimate request and inserts a modified record (e.g., reusing the from, contact, date, and call-ID fields) thereinto, the intercepted request is not eligible for being a legitimate SIP request because the request must be routed to the URI identified in the contact header field. A replay attack with a modified contact header that does not match the active fingerprint is flagged as an attack.

According to one embodiment, behavior analysis module 514 records system activities and generates an anomalic system event when any aberration activity is detected. Behavior analysis module 514 also classifies the collected information into session-variant and session-invariant database 503 and 504. Databases 503 and 504 are addressed by the AOR and/or source IP address. Given an AOR or the source IP address, all session-variant and invariant information is easily retrievable from databases 503 and 504.

Figure 6:
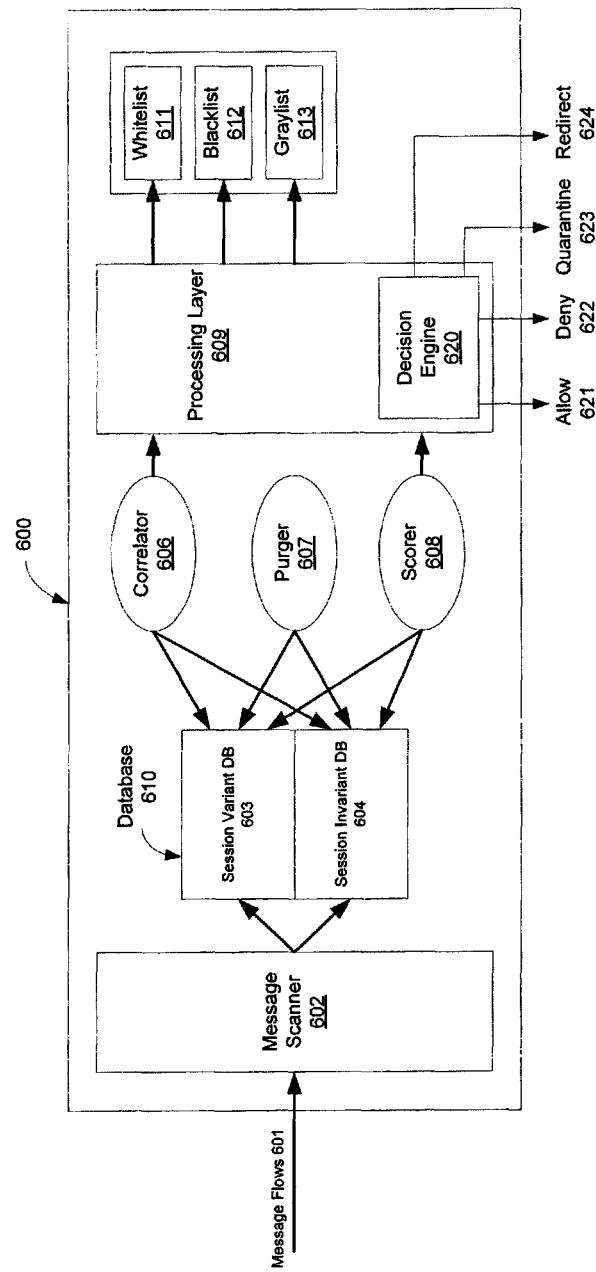
FIG. 6 illustrates an exemplary architecture of a behavioral learning system, according to one embodiment.

FIG. 6 illustrates an exemplary architecture of a behavioral learning system, according to one embodiment. Messages flows 601 flow into message scanner 602, which classifies the information present in the message flow 601 and responds to database 610. The information is stored in database 610 for each AOR. As new signaling information arrives, purger 607 either overwrites the old information with the new information. The information may be compressed when being stored in database 610 to optimize the memory usage thereof. Correlator 606 is responsible for comparing incoming message flows 601 with the stored session-variant and invariant information to detect any anomalic behaviors. Correlator 606 reports the results to meta processing layer 609. Scoring engine 608 assigns a score to each incoming flow based on the information in database 610 and feeds the score to meta processing layer 609. Meta processing layer 609 uses the results from correlator 606 and the assigned score to classify the received flows into whitelist 611, blacklist 612, or graylist 613. If an entry already exists for a particular AOR record, the existing AOR record is either moved to another list based on the newly learned information, or a new score is assigned based on the results from scorer engine 608 in combination with the past scores accumulated for this AOR record to present. Based on the updated information, well-behaved AOR records from graylist 613 may be upgraded to whitelist 611, or misbehaved AOR records from graylist 613 may be downgraded to blacklist 612.

Incoming message flows 601 are compared with the prior recorded AOR records as well as the learned behavior from each of the lists (whitelist 611, blacklist 612, and graylist 613). Based on the newly collected information, a decision is made as to either allow 621, deny 622, quarantine 623, or redirect 624 a call flow for a given subscriber. According to one embodiment, decision engine 620 adopts one or more advanced behavioral algorithms, such as Hellinger distances, support vector mechanics, and multivariate Bayesian learning algorithms, to correlate the learned behavior over a period of time with a composite of security rules. For example, well-defined exceptional policy validations identify expected policy violations by network elements at any given time to prevent or minimize false positives.

Figure 7:
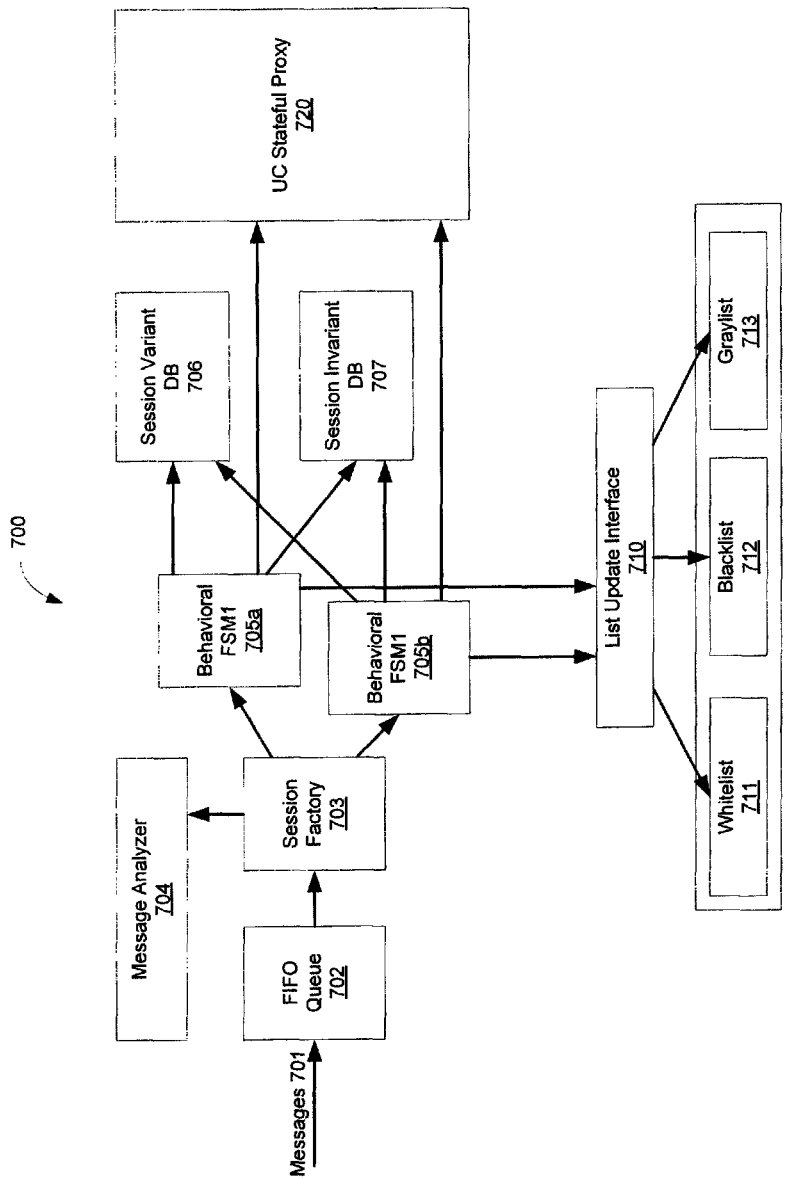
FIG. 7 illustrates an exemplary diagram of a behavior learning engine, according to one embodiment.

FIG. 7 illustrates an exemplary diagram of a behavior learning engine 700, according to one embodiment. Behavior learning engine 700 includes internal modules as well as external interfaces and global data structures. In one embodiment, behavior learning engine 700 may use Java collection classes for its databases and global data structures, however, it is appreciated that any other database languages and structures may be used without deviating from the present subject matter.

According to one embodiment, behavior learning engine 700 runs in a learning (or training) mode or an inline (or production) mode. In a learning mode, behavioral engine 700 monitors incoming messages 701 and updates session-variant and session-invariant database 706 and 707. Behavioral learning engine 700 also keeps track of the behaviors of messages 701 such as average call rate, peak call rate, call rate of each user at different time intervals, call history, call patterns, application runtime behavior, protocol state, etc. The learned information is used later in an inline mode to detect and prevent real-time attacks.

In an inline mode, behavioral learning engine 700 applies the learned behaviors and runs learning algorithms to classify incoming messages 701. If any threat is detected by behavioral learning engine 700, appropriate actions are taken.

According to one embodiment, behavior learning engine 700 is implemented as a singleton class with mode as a member variable. The mode determines whether behavior learning engine 700 is running in an inline or a learning mode. The learning mode is operated in a staged and well-controlled environment where all traffic messages passed through the system are benign. Behavior learning engine 700 passively learns all the properties of the traffic, session, endpoints, and applications seamlessly and updates the AOR records. When switched to an inline mode, the learned behaviors in the learning mode are referenced when analyzing incoming flows using a set of algorithms to identify and track aberrations in the incoming flows.

Incoming messages 701 are received and queued in internal FIFO queue 702. In one embodiment, a thread pool may be implemented to store and process incoming messages 701 in FIFO queue 702. Session factory 703 receives a message queue in FIFO queue 702 and instantiates appropriate behavioral finite state machines (FSMs) 705 after analyzing the message using message analyzer 704. In one embodiment, each behavioral FSM 705 classifies session-variant and invariant information out of the analyzed message, update session databases 706 and 707, and generate one or more events for UC stateful proxy 720. In another embodiment, message analyzer 704 or a dedicated FSM 705 classifies session-variant and invariant information out of the received messages 703. System events generated by each behavioral FSM 705 are passed to UC stateful proxy 720.

UC stateful proxy 720 handles system events created by behavioral FSMs 705. Examples of such system events are session terminate, initiate Turing tests, increase threshold, decrease threshold, deny feature, send retry after, update method filter, deny method, and deny feature tag.

According to one embodiment, SIP sessions are classified into registration sessions, invite sessions, subscribe-notify sessions, publish sessions, and refer sessions based on the type of session. Session-variant information is deleted when the session ends whereas session-invariant information is stored after the session ends. The collected session-invariant information is used to build and update session-invariant database 707 that is used as reference when analyzing new messages 701.

A registration session starts with a register message and ends with a deregister message, register with expires 0, or a timeout. On deregister, one or more sessions associated with the AOR that is to be deregistered are also destroyed. It is noted that only the session-variant entries are deleted while the session-invariant entries continue to persist, age and are further analyzed to learn new behaviors. The session-variant part may be updated with every refresh message.

Registered sessions are stored in session-variant database 706. Each registered session has an associated timer in order to indicate when the session starts and how long the registration is invalid. Once the registration timer expires, session-variant information is removed. All requests and responses from endpoints are matched against session-variant database 706, and any messages sent after the registration expired for a given contact are flagged as possible attacks because it violates RFC 3261 of SIP.

A SIP session starts with an invite message and ends with a bye message. Session-variant information may be updated with any in-session messages. This session may be stored as part of the registration session for a given AOR. There may be other in-session messages carrying the same call-ID (e.g., refer, info). Refer methods are used when an origination party wants to invite multiple users to an already established connection (e.g., conference session). Any messages outside the standard allowed SIP methods (e.g., refer, info) with a modified session-variant variable are flagged as an error indicating a possible attack.

Publish sessions starts with every publish message and ends with expiry zero or a timeout. Any non-subscribe refresh message starts a session and ends with either a timeout or a notify with subscribe termination indication. This is mainly used in event framework messages. Presence is an example of this type of session. Any notify messages after the subscribe session expires are flagged indicating a possible attack and. The call flow of publish sessions is similar to that of register.

Refer (or refer-notify) sessions start with a refer message and ends with a bye message, refer timeout, or notify with end of session indication. The call flow of refer sessions is similar to that of register.

According to one embodiment, databases 706 and 707 group multiple AOR records with tuples of information. Each session instantiates one or more behavior learning FSMs 705. Some sessions are cross-verified to ensure that there are no violations among the instantiated FSMs 705. For example, an invite session and a registration session are cross-checked. AOR records bind both requests and respond results together. The AOR record with successful completion receives a satisfactory score. The score may be improved upon multiple occurrences of successful completion. Scoring engine 608 maintains a separate identity for each AOR record. Actions for all new incoming requests that have matching AOR records are tied to the prior results stored in whitelist 711, blacklist 712 and graylist 713.

In a learning mode, behavior FSMs 705 populate AOR records. The learning mode may be operated by a trained professional within a restricted (DMZ) zone where it is assumed that the probability of attacks is low. All SIP and RTP activities passing through the system are passively recorded assuming that they are legitimate and safe, and their behavioral state is translated into session and global AOR records. In order to optimize the memory usage and storage, the AOR records may be compressed. In one embodiment, single-user activities may be tracked by correlating all the AOR records that the user makes over a period of time. Single-user and multi-user activities may be correlated for cross-verification.

According to one embodiment, behavior learning engine 700 applies various validation enforcers at individual AOR records after the analysis and inspection of messages 701. Behavior learning engine 700 applies enforcement policies to end-user applications such as Web-conferencing and messaging services with improved fidelity. Validation enforcers employed by behavior learning engine 700 include but are not limited to:

a) Name
b) Minimum length
c) Maximum-length
d) Allowable method types (e.g., register, invite, cancel, etc.)
e) Allowable data types (e.g., integer, float, Boolean, string, user-defined data type, etc.)
f) Detection of user-input data variables (e.g., runtime regular expression)
g) Allowable characters (e.g., [a-z], [.], [@], etc.)
h) Deny-characters (e.g., ', <, >, etc.)
i) Deny keywords (e.g., SELECT, UNION, DROP, <script>, etc.)
j) Session-variant/invariant
k) System activity thresholds.

For example, if the CPU usage is detected to be greater than a threshold during a time window, an anomalic event is declared.

In an inline mode, validation enforcers applied at each AOR record are strictly enforced. There may also be a possibility that some AOR records may not have validation enforcers due to lack of precise information. In such a case, anomalic events are generated and forwarded to decision engine 520 which combines such events to accurately identify the source of an attack that caused the anomalic events.

Decision engine 520 adopts a Unified Threat Assessment (UTA) methodology to correlate various meta information passed from different modules and engines (e.g., analysis modules 511-516, inspection engines 531-536) to detect malicious activities with high fidelity. Decision engine 520 makes a decision whether to allow (521), deny (522), quarantine (523), or redirect (524) flow streams. According to one embodiment, users can configure options for making a decision. For example, an administrator may configure the system to allow all communication traffics coming from only a specific type of endpoints (e.g., Ploycom-SZ-Ver2.0).

According to one embodiment, advanced algorithms such as support vector mechanics (SVM), fuzzy logic, Bayesian algorithms, and system correlation are used to identify the sources of malicious attacks. Decision engine 520 works closely with various remediation modules 521-524. In one embodiment, origination sources may be ping-tested to detect whether they are automated war-dialing attackers. Honeypot mechanisms may be used to redirect suspicious activity for further analysis. Voice VLAN may be isolated to reduce the scope of the incoming traffic to a specific VLAN-ID. If traffic is originated from a suspicious source (e.g., a source that sends inline requests), the traffic is blocked and terminated. Strong authentication challenge and enforcement of authenticated identity bodies (see RFC 3261, RFC 3893, RFC 4474) are adopted to challenge the origination source if a suspicious activity is detected.

UC applications involve multimedia sessions and interaction between multiple application servers or service enablers. Service enablers provide common services to users and applications. Recent UC applications involve one or more service enablers such as presence and availability servers, group and list management servers, Web servers, registrars and redirect servers, and database servers.

Most common UC applications are conferencing applications and messaging applications, call center, collaboration applications, and push-to-talk services. Recent conferencing applications contain multimedia sessions that integrate many services including voice, video, instant message, presence and availability, and group management services. In one embodiment, presence and availability service uses SIMPLE protocol. Group management service uses XML Configuration Access Protocol (XCAP). A conference session is started using SIP protocol. Other participants are added to an open session using a SIP refer method. To protect applications and enablers involved in a UC application, all the sessions involved in the application need to be tracked and correlated. Most current solutions deal with only individual sessions so that they do not have holistic application-level knowledge. Newer attack tools may take advantage of the limitation of session-oriented protection solutions to attack or hack into enterprise applications. The present system and method prevents such attacks in a efficient and collective manner.

According to one embodiment, the present system and method employs continuous session tracking. Sessions including attacks may move from one session to another session, and there may be many sessions joined together by a common correlator. Continuous session tracking involves tracking sessions across many protocols, for example, SIP, SIMPLE, HTTP, XCAP, etc.

According to one embodiment, the present system and method employs session description protocol (SDP) validation. SDP along with SIP protocol is used to initiate various multimedia sessions. The parameters within a SDP message are responsible for setting up media sessions. If any of these parameters are compromised, attackers may hijack a session or add themselves to session silently. SDP validation analyzes and correlates various parameters in SDP to protect against any SDP attacks.

According to one embodiment, the present system and method employs dual-tone multi-frequency (DTMF) protection. DTMF signals may be used to enter passwords, back account numbers, social security numbers etc. Many UC applications rely on getting user inputs using DTMF digits. DTMF signals may be send by the user using signaling or media path. SIP info method may be used to send DTMF signals, or alternatively RTP may also be used to send DTMF signals. DTMP protection protects both the SIP and RTP payloads so that attackers can not record or replay these values.

According to one embodiment, the present system and method employs message waiting indication (MWI) protection. Message waiting feature is one of the key features of any UC application that use messages. An attacker may intercept a message to get information about the voice mail details of a particular user, or use the information to generate denial of service (DOS) attacks on the user. MWI relies on getting notify messages from the application server to the user's phone. The user's phone subscribes to this feature by sending a subscribe message to the voice mail server. MWI protection ensures that only the authorized user can subscribe to their message waiting indications.

According to one embodiment, the present system and method employs refer protection. Refer is a SIP method used to add other users to an existing conference. For confidential company meetings, security appliance must ensure that only authorized users are allowed to invite others to the session. When a new user joins a conferencing session, refer protection allows only authorized users to join the session by strict call admission control screening using continuous session tracking.

In addition to the above-mentioned features, an admin user may create and modify various application policies for any UC application that he or she may run. Strict call admission control policy may be enforced to protect various applications and their usage.

Figure 8:
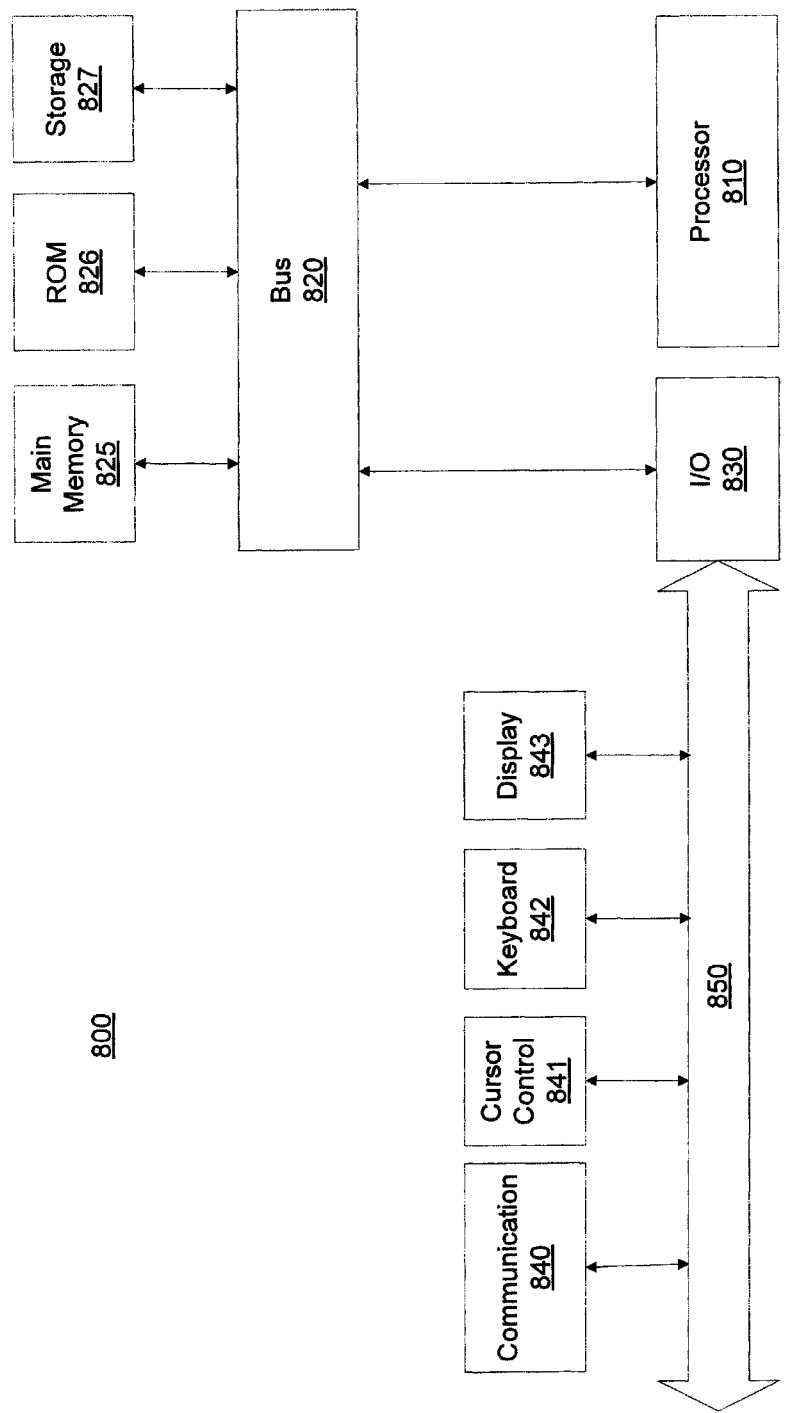
FIG. 8 illustrates an exemplary computer architecture for use with the present system, according to one embodiment.

FIG. 8 illustrates an exemplary computer architecture 800 for use with the present system, according to one embodiment. Computer architecture 800 can be used to implement a UCTM system 105 with all or a part of the components shown in FIG. 8. One embodiment of architecture 800 comprises a system bus 820 for communicating information, and a processor 810 coupled to bus 820 for processing information. Architecture 800 further comprises a random access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Architecture 800 also may include a read only memory (ROM) and/or other static storage device 826 coupled to bus 820 for storing static information and instructions used by processor 810.

A data storage device 827 such as a magnetic disk or optical disc and its corresponding drive may also be coupled to computer system 800 for storing information and instructions. Architecture 800 can also be coupled to a second I/O bus 850 via an I/O interface 830. A plurality of I/O devices may be coupled to I/O bus 850, including a display device 843, an input device (e.g., an alphanumeric input device 842 and/or a cursor control device 841).

The communication device 840 allows for access to other computers (servers or clients) via a network. The communication device 840 may comprise a modem, a network interface card, a wireless network interface or other well known interface device, such as those used for coupling to Ethernet, token ring, or other types of networks.

A system and method to precisely learn and enforce positive security model for unified communication applications and endpoints has been described with respect to specific examples and subsystems. It will be apparent to those of ordinary skill in the art that it is not limited to these specific examples or subsystems but extends to other embodiments as well.

We claim:

1. A system, comprising:
a server computer having a processor, the server computer in communication with a network; and
instructions stored on the server computer, executable by the server computer, the instructions configuring the server computer to
receive a plurality of messages in a network, the network comprising a plurality of endpoints and UC application servers, the plurality of messages contained within a unified communication (UC) stream having a transport stream and an application stream, wherein the unified communication stream comprises one or more streams related to one or more of IP-PBX, video, desktop conferencing, web conferencing, collaboration, presence, unified messaging, instant messaging (IM), voicemail, Interactive Voice Response (IVR), Automatic Call Distribution (ACD) or contact center applications, and wherein the application stream comprises session states correlating to a plurality of applications;
inspect the plurality of messages at a transport layer and an application layer to determine whether the UC stream corresponds to a positive flow model, the positive flow model defining legitimate flow streams to distinguish the legitimate flow streams from potential attacks or bad behaviors by providing real-time analysis of a UC state level and correlating the UC state level with a learned behaviors baseline;

record positive attributes of the UC stream, wherein positive attributes include UC session variant data, UC session invariant data, user and device profiles, system properties, security profiles, application profiles, protocol properties, UC application transactions, and server behaviors;

store in a database a plurality of address-of-record (AOR) records in an address-of-record (AOR) table, the AOR table storing positive attributes, properties of previously received messages from the plurality of endpoints, and learned behaviors of the plurality of endpoints;

analyze a message from an endpoint of the plurality of endpoints to produce a system event and correlate the system event with the learned behaviors and plurality of AOR records in the database; and classify the message into one of a whitelist, a blacklist, and a graylist based on a score of the message, wherein the whitelist contains AOR records that are legitimate, the blacklist contains AOR records that are a potential attack, and the graylist contains AOR records that belong to neither the whitelist nor the blacklist.

2. The system of claim 1 further comprising deciding an action on the message, the action being one of allow, deny, quarantine, or redirect.

3. The system of claim 2, wherein the deciding comprises applying a composite of security rules that are constructed based on the properties of the previously received messages from the plurality of endpoints and the learned behaviors of the plurality of endpoints obtained over a period of time.

4. The system of claim 1 wherein the score of the message is generated by using multivariate probability metrics.

5. The system of claim 1, wherein the system operates a plurality of finite state machines, each of the plurality of finite state machines including traffic analysis, content analysis, structural analysis and behavioral analysis.

6. The system of claim 1, wherein the system operates in a learning mode, wherein the learning mode is operated in a controlled environment such that the properties of the messages and the endpoints are learned.

7. The system of claim 1, wherein system events include session terminate, initiate Turing tests, increase threshold, decrease threshold, deny feature, send retry after, update method filter, deny method, and deny feature tag using respective protocol constructs.

8. The system of claim 1, wherein the system continuously tracks additional messages from the endpoint and updates the AOR records associated with the endpoint.

9. The system of claim 1, wherein the database is divided into a session-variant database and a session-invariant database, wherein the session-variant database stores the AOR records that vary between messages within a session and the session-invariant database stores the AOR records that are constant between messages across the sessions.

10. A computer-implemented method, comprising:
receiving a plurality of messages from a plurality of endpoints, the plurality of messages contained within a unified communication (UC) stream having a transport stream and an application stream, wherein the unified communication stream comprises one or more streams related to one or more of IP-PBX, video, desktop conferencing, web conferencing, collaboration, presence, unified messaging, instant messaging (IM), voicemail, Interactive Voice Response (IVR), Automatic Call Distribution (ACD) or contact center applications; and wherein the application stream comprises session states correlating to a plurality of applications;

inspecting the plurality of messages at a transport layer and an application layer to determine whether the UC stream corresponds to a positive flow model, the positive flow model defining legitimate flow streams to distinguish the legitimate flow streams from potential attacks or bad behaviors by providing real-time analysis of a UC state level and correlating the UC state level with a learned behaviors baseline;

recording positive attributes of the UC stream, wherein positive attributes include UC session variant data, UC session invariant data, user and device profiles, system properties, security profiles, application profiles, protocol properties, UC application transactions, and server behaviors;

storing a plurality of address-of-record (AOR) records in an address-of-record (AOR) table in a database, the AOR table storing positive attributes, properties of previously received messages from the plurality of endpoints, and learned behaviors of the plurality of endpoints;

analyzing a message from an endpoint of the plurality of endpoints to produce a system event;

correlating the system event with the learned behaviors and plurality of AOR records in the database; and classifying the message into one of a whitelist, a blacklist, and a graylist based on a score of the message, wherein the whitelist contains AOR records that are legitimate, the blacklist contains AOR records that are a potential attack, and the graylist contains AOR records that belong to neither the whitelist nor the blacklist.

11. The computer-implemented method of claim 10 further comprising issuing an action on the message, the action being one of allow, deny, quarantine, or redirect using protocol constructs.

12. The computer-implemented method of claim 10 further comprising applying a composite of security rules that are constructed based on the properties of the previously received messages from the plurality of endpoints and the learned behaviors of the plurality of endpoints obtained over a period of time.

13. The computer-implemented method of claim 10 wherein the score of the message is generated by using multivariate probability metrics.

14. The computer-implemented method of claim 10 further comprising operating a plurality of finite state machines, each of the plurality of finite state machines including a decision engine and an analysis engine, wherein the analysis engine comprises traffic analysis, content analysis, structural analysis and behavioral analysis.

15. The computer-implemented method of claim 10 further comprising operating a learning mode in which the properties of the messages and the endpoints are learned in a controlled environment.

16. The computer-implemented method of claim 10 wherein system events include session terminate, initiate Turing tests, increase threshold, decrease threshold, deny feature, send retry after, update method filter, deny method, and deny feature tag using protocol constructs.

17. The computer-implemented method of claim 10 further comprising continuously tracking additional messages from the endpoint; and updating the AOR records associated with the endpoint.

18. The computer-implemented method of claim 10, wherein the database is divided into a session-variant database and a session-invariant database, wherein the session-variant database stores the AOR records that vary between messages within a session and the session-invariant database stores the AOR records that are constant between messages across the sessions.

\* \* \* \* \*